US009351301B2

(12) United States Patent
Lee et al.

(10) Patent No.: US 9,351,301 B2
(45) Date of Patent: May 24, 2016

(54) MAINTENANCE OF TIME SLOT USAGE INDICATORS AND SELF-ORGANIZING NETWORKING (71) Applicants: Daniel Chonghwan Lee, Burnaby (CA); Eric James Yun Loong Lee, Coquitlam (CA); Ehsan Seyedin, Burnaby (CA)

(72) Inventors: Daniel Chonghwan Lee, Burnaby (CA); Eric James Yun Loong Lee, Coquitlam (CA); Ehsan Seyedin, Burnaby (CA)

( * ) Notice: Subject to any disclaimer, the term of this patent is extended or adjusted under 35 U.S.C. 154(b) by 204 days.

(21) Appl. No.: 13/968,425

(22) Filed: Aug. 15, 2013

(65) Prior Publication Data
US 2015/0049644 A1 Feb. 19, 2015

(51) Int. Cl.
H04W 72/04 (2009.01)
H04W 84/20 (2009.01)
H04B 7/26 (2006.01)

(52) U.S. Cl.
CPC ............ *H04W 72/0446* (2013.01); *H04B 7/26* (2013.01); *H04W 84/20* (2013.01)

(58) Field of Classification Search
None
See application file for complete search history.

(56) References Cited

U.S. PATENT DOCUMENTS

| | | | |
|---|---|---|---|
| 7,020,701 B1 | 3/2006 | Gelvin | |
| 7,046,639 B2 * | 5/2006 | Garcia-Luna-Aceves et al. | 370/314 |
| 7,630,326 B1 | 12/2009 | Shear | |
| 7,787,427 B1 | 8/2010 | Simon | |
| 8,139,554 B1 | 3/2012 | Doherty | |
| 8,140,658 B1 | 3/2012 | Gelvin | |
| 8,320,340 B2 | 11/2012 | Sim | |
| 8,553,659 B2 * | 10/2013 | Nandagopalan et al. | 370/338 |
| 2010/0146138 A1 * | 6/2010 | Ng et al. | 709/231 |
| 2010/0201516 A1 | 8/2010 | Gelvin | |
| 2010/0226344 A1 * | 9/2010 | Nandagopalan | 370/338 |
| 2011/0035491 A1 | 2/2011 | Gelvin | |
| 2014/0029593 A1 * | 1/2014 | Nandagopalan et al. | 370/336 |

OTHER PUBLICATIONS

R. Yadav, S. Varma, and N. Malaviya, "A Survey of MAC Protocols for Wireless Sensor Networks," UbiCC Journal, Aug. 2009, pp. 827-833, vol. 4, No. 3.
T. O'Donovan, J. Brown, U. Roedig, C. J. Sreenan, J. do O, A. Dunkels, A. Klein, J. Sa Silva, V. Vassiliou, and L. Wolf, "Ginseng: performance control in wireless sensor networks," Proceedings of 7th Annual IEEE Communication Society Conference on Sensor Mesh and Ad Hoc Communications and Networks (SECON), Jun. 2010.
I. Demirkol, C. Ersoy, and F. Alagoz, "MAC protocols for wireless sensor networks: a survey," IEEE Communications Magazine, VO. 44, Issue 4, pp. 115-121, Apr. 2006.
H. Labiod, H. Afifi, and C. De Santis, Wi-Fi. Bluetooth, Zigbee and WiMAX, 2007, Dordrecht : Springer.

(Continued)

Primary Examiner — Hicham Foud (57) ABSTRACT

Provided are methods by which multiple devices self-form a communication network and self-coordinate their access to communication media. In these methods, an individual node maintains its knowledge of other nodes in its vicinity and knowledge of those nodes' scheduled activities to an adequate degree of details. Such knowledge can be obtained by receiving control signals from nodes that are within the range of wireless communication. Examples of such knowledge include the identities of the nodes in the vicinity, the nodes' scheduled times of control message transmission and/or reception, the nodes' scheduled times of application data transmission and/or reception, etc. Such knowledge can be embodied in the form of a memory module of a computing device.

17 Claims, 1 Drawing Sheet

Application Timeslot Format, multiple transactions

(56) References Cited

OTHER PUBLICATIONS

I. F. Akyildiz, W. Su, Y. Sankarasubramaniam, and E. Cayirci, "A survey on sensor networks," IEEE Communications Magazine, vol. 40, Issue 8, pp. 102-114, Aug. 2002.

LAN/MAN Standards Committee, IEEE Computer Society, IEEE Standard for Local and metropolitan area networks Part 15.4:Low-Rate Wireless Personal Area Networks (LR-WPANs), 2011.

IEEE Computer Society, "Part 11: Wireless LAN Medium Access Control (MAC) and Physical Layer (PHY) Specifications," 2012.

W. Ye, J. Heidemann, and D. Estrin, "An Energy-Efficient MAC Protocol for Wireless Sensor Networks," In Proceedings of IEEE INFOCOM, New York, NY, USA, Jun. 2002, pp. 1567-1576, vol. 3.

T. van Dam and K. Langendoen, "An Adaptive Energy-Efficient MAC Protocol for Wireless S-ensor Networks", in Proceedings of the first ACM Conference on Embedded Networked Sensor Systems (SenSys), 2003, pp. 171-180.

I. Rhee, A. Warrier, M. Aia, and J. Min, "ZMAC: A Hybrid MAC for Wireless Sensor Networks", in Proceedings of the 3rd ACM Conference on Embedded Networked Sensor Systems, (SenSys), 2005, pp. 90-101.

E. Seyedin, D.C. Lee, S. Yang, E. Lee, D. Boone, M. Steiner-Jovic, "Powermesh medium access control protocol", in Proceedings of the 5th International Conference on Signal Processing and Communication Systems (ICSPCS), Dec. 2011.

P. Suriyachai, U. Roedig, and A. Scott, "A Survey of MAC Protocols for Mission-Critical Applications in Wireless Sensor Networks," IEEE Communications Surveys & Tutorials, Second Quarter, pp. 240-264, vol. 14, No. 2, 2012.

* cited by examiner

FIG. 1 Application Timeslot Format, single transaction

FIG. 2 Application Timeslot Format, multiple transactions

FIG. 3 Beacon Timeslot Format

FIG. 4 OR1 Timeslot Format

FIG. 5 OR2 Timeslot Format

MAINTENANCE OF TIME SLOT USAGE INDICATORS AND SELF-ORGANIZING NETWORKING

CROSS-REFERENCE TO RELATED APPLICATIONS

This application claims the benefit of provisional patent application No. 61/683,719 filed 16 Aug. 2012 and entitled METHOD OF MULTIPLE DEVICES SELF-FORMING A NETWORK AND COORDINATING MEDIUM ACCESS.

TECHNICAL FIELD

The invention relates to the fields of wireless networks, sensor networks, device-to-device communications, and machine-to-machine communications.

BACKGROUND-PRIOR ART

Low energy consumption and long battery life are important qualities to consider in designing and operating wireless networks. One way of reducing the networked devices' energy consumption is to enable the devices to go to inactive or sleep mode when possible, but without disrupting the network operation. It would be beneficial to lower the duty cycle of nodes while still achieving the goal of the network operation.

Institute of Electrical and Electronics Engineers (IEEE) 802.11 standards specify physical layer and medium access control (MAC) layer protocols for wireless local area networks (WLANs). The basic service set (BSS), which is a group of devices that communicate with one another, is the building block of an IEEE 802.11 network. The BSS can be realized in two ways—independent BSS and infrastructure BSS. An infrastructure BSS has an access point, and the BSS is naturally delineated and limited by the radio reachability to and from the access point. Prior to the 802.11s standard, IEEE 802.11 standards did not provide packet routing for ad hoc networks, and it is difficult to coordinate power saving (sleep) modes of the devices except for the case of infrastructure BSS. It has been reported that 802.11 is not appropriate for applications such as the sensor networks, which need low duty cycle. In 802.11, nodes' idle listening consumes much energy.

Institute of Electrical and Electronics Engineers (IEEE) 802.15.4 standards specify the physical layer and medium access control (MAC) layer protocols for low-rate wireless personal area networks (LR-WPANs). The IEEE 802.15.4 standards are also commercially popular for wireless sensor networks. The IEEE 802.15.4 MAC provides two modes of operation—the beacon-enabled (synchronous) mode and the beaconless (asynchronous) mode. In the beacon-enabled mode, synchronization through transmission and reception of beacons allows devices to get into energy-saving (sleep) mode between coordinated transmissions, and thus helps reduce energy consumption. In a multi-hop network, the beaconless mode requires nodes to always listen for other nodes' transmission. IEEE 802.15.4 classifies devices into Full Function Devices (FFDs), which can broadcast their beacons, and Reduced Function Devices (RFDs), which cannot broadcast beacons. In the beacon-enabled mode, devices can coordinate data transmission with one another.

A main advantage of IEEE 802.15.4 standards is its low energy consumption. However, 802.15.4 networks can suffer from a serious reliability problem if a contention-based medium access control (MAC) protocol is used. It has been reported that a very low packet delivery ratio is observed whenever the power management mechanism is enabled. For reliability, Guaranteed Time Slots (GTSs) can be used in the beacon-enabled (synchronous) mode. However, IEEE 802.15.4 in beacon-enabled mode does not define when full-function devices (FFDs) are to broadcast their own beacons in multi-hop topologies, and thus the standards do not present how the nodes form a synchronous cluster-tree network. In addition, the medium access control of IEEE 802.15.4 does not solve the hidden node problem, and the hidden node problem can seriously degrade network performance and waste energy when the traffic load is heavy.

Bluetooth Low Energy (BLE) is a feature of Bluetooth version 4.0 and is aimed at principally low-power applications of wireless devices. In some cases, Bluetooth Low Energy enables products to operate for more than one year without recharging the battery. BLE is optimized for non-continuous traffic and is suitable for devices that periodically transmit data, such as sensors that periodically report their sensor data. However, the Bluetooth Low Energy standard does not support "scatter net" formation. BLE only allows for "piconet" formation—all nodes in the network should be within the radio range of the cluster head (master) node. The radio range of BLE devices is 50 meters. If devices are distributed over distances much more than 100 meters in diameter, a BLE network is not suitable.

As energy efficiency is an important design criterion for wireless sensor networks (WSN), a number of wireless sensor network protocols have been expressly designed for that purpose. In many WSN applications, devices are idle for a large portion of time, but nodes that are idle yet listening still consume much energy. As idle-listening is a major reason for energy waste, the S-MAC and T-MAC protocols, which are respectively found in Wei Ye, John Heidemann, and Deborah Estrin, "An Energy-Efficient MAC Protocol for Wireless Sensor Networks," in *Proceedings of the 21st International Annual Joint Conference of the IEEE Computer and Communications Societies (INFOCOM 2002)*, New York, N.Y., USA, June, 2002; and T. Dam, K. Langendoen, "An Adaptive Energy-Efficient MAC Protocol for Wireless S-ensor Networks", in *Proceedings of the first ACM Conference on Embedded Networked Sensor Systems (SenSys)*, 2003, are designed to make the duty cycles of the nodes low. In S-MAC and T-MAC, each node repeats a cycle of active state and sleep state, and nodes attempt to synchronize their active states by exchanging SYNC packets. During their active state, medium access control is contention-based. In order to avoid packet collisions, nodes use Request-to-Send (RTS) and Clear-to-Send (CTS) packets. Z-MAC, which is presented in I. Rhee, A. Warrier, M. Aia, and J. Min "ZMAC: A Hybrid MAC for Wireless Sensor Networks", in Proceedings of the 3rd ACM Conference on Embedded Networked Sensor Systems, (*SenSys*), 2005, is a hybrid MAC protocol that combines TDMA and CSMA. Z-MAC performs time slot assignment at the time of deployment, so high overhead is incurred at the beginning. In each assigned time slot, nodes are required to perform carrier sensing in order to avoid collisions. The node to which the time slot is assigned (the owner of the time slot) exercises higher priority in carrier sensing by adjusting the initial contention window size in such a way that the owner of the time slot has an opportunity to transmit earlier than non-owners.

In order to avoid application packet collisions, the Power-mesh MAC protocol, which is presented in E. Seyedin., D. C. Lee, S. Yang, E. Lee, D. Boone, M. Steiner-Jovic, "Powermesh medium access control protocol", in *Proceedings of the 5th International Conference on Signal Processing and Communication Systems (ICSPCS)*, 2011,
separates signals from different devices in the time domain through scheduling. Powermesh allows devices to dynamically schedule their transmission and reception times in a distributed manner. Scheduling is performed based on the devices' local knowledge of the current schedule in the vicinity and the devices' need for transmitting application packets. Devices can be in a sleep mode when not scheduled for transmission or reception. In the Powermesh protocol, devices cannot distinguish whether a time slot is scheduled for transmission and reception of a control packet or a data (application) packet, and this ambiguity makes it difficult to detect and repair conflicting schedules.

SUMMARY OF THE INVENTION

The embodiments of the medium access control protocol and communication through a network presented in this disclosure allows the devices in the network to dynamically schedule the use of time slots in a distributed way on the basis of the devices' knowledge of transmission and reception activities in their vicinity. Devices maintain a set of indicators corresponding to time slots, wherein each indicator specifies the corresponding time slot's scheduled use for different purposes, distinguishing among scheduled for conveyance of control packet, conveyance of data (application) packet, and no schedule.

The disclosed communication enables the devices to reduce their duty cycles due to the ability of the nodes to sleep while still maintaining network operation, and solves the well-known 'hidden node problem' common to wireless networking. The disclosed communication enables high network throughput by allowing for spatial bandwidth reuse and allows congestion control for the upstream traffic in a tree topology.

DETAILED DESCRIPTION

The invention can be implemented in numerous ways, including as a process, a system, an apparatus, a network of programmable devices wherein program instructions are transmitted and received over wireless medium, or a composition of matter. A detailed description of one or more embodiments of the invention is provided below. The invention is described in connection with such embodiments but is not limited to any embodiment. The following description includes specific details in order to provide a thorough understanding of the invention. These details are provided for the purpose of example, and the invention may be practiced according to the claims without some or all of these specific details. Communicating using a wireless network is described. The described communicating includes controlling wireless medium access by the devices in the wireless network.

For medium access control, the devices partition the medium access time into time slots. A number of consecutive time slots form a superframe, with the first time slot of the next superframe beginning immediately after the final timeslot of the current superframe. For medium access control, the devices perform cooperative distributed scheduling of time slots and allow for spatial timeslot reuse. Through cooperation and negotiation, time slots are assigned for specific purposes—for example, for a particular node's (say node N's) transmission of its control packet, for node N's reception of another node's control packet, for node N's transmission of its application data packet, for node N's reception of an incoming data packet, etc. An application data packet contains information that is to be conveyed between entities that are using the network for communication. A control packet contains information that flows among network nodes for the purpose of controlling the network operation. For example, a beacon message, which contains the node's identity and announces the node's presence to its neighbor nodes, is a control packet. A message that contains a node's request for permission to transmit in a particular time slot, for example, is also a control packet. Control packets that contain information about time slot assignments are transmitted and received throughout the network in a distributed fashion without requiring central coordination. Time slots assigned for use can be classified into two groups—time slots assigned for transmitting or receiving a control packet and time slots assigned for transmitting or receiving an application (data) packet.

For wireless medium access control, each device transmitting or receiving signals maintains its own neighborhood map (NM). In this disclosure, the term neighborhood map is defined as an ordered set of indicators corresponding to the time slots of the superframe, wherein an indicator corresponding to a specific time slot indicates to the device the scheduled use of that time slot in the vicinity of the device. The neighborhood map (NM) of a node (device) specifies that node's current perception of scheduled time slot use within its neighborhood (vicinity). The neighborhood of a device is defined as the physical area covered by its radio range. A neighbor node of node (device) N is a node that is within the radio range of node N. Node N's neighbors are all located within node N's neighborhood. A neighborhood map (NM) can be implemented as an array of integers, with each array element corresponding to each time slot in a superframe. In such an implementation, the number of elements in the array is the same as the number of time slots in a superframe. In such an implementation, the elements of the array, which take integer values, will be referred to as assignment indexes in this disclosure. Each individual node maintains its own neighborhood map. Let us denote by $M_N$ the neighborhood map of node N. The contents (the values of the array elements) of this array (neighborhood map $M_N$) are updated as the node (node N) obtains new information about the assignment or scheduled use of time slots in its neighborhood. We denote by $M_N f$ the neighborhood map contents at superframe f; that is, node N's perception of the scheduled use of the time slots in superframe f. We denote by $M_N(f,i)$ the ith element of the ordered set (array element i), which indicates node N's perception of how the ith time slot is assigned in its neighborhood during superframe f. Note that while implementing a neighborhood map as an array of integers is conceptually simple, a neighborhood map can be encoded in a different manner, which can be more efficient in terms of the number of bits required. The value of an assignment index indicates a node's perception of how that time slot is currently assigned in its neighborhood, ranging from unassigned to assigned for different purposes. Based on its own actions along with information received from other nodes, a node updates the assignment indexes in various ways. It is important to note that a node's NM (the node's perception) may not correctly reflect the actual timeslot assignments in its neighborhood. When a node's NM contains severely outdated or incorrect information, network performance may be degraded and packet collisions may often occur.

The primary method for collision avoidance in the disclosed medium access control is the intelligent assignment of time slots, and this intelligence is enabled by the neighborhood map. For example, when choosing new time slots for packet transmission or reception, a node consults the information in its NM. Since the NM contains information about perceived time slot assignments for neighbor nodes, a node is able to identify and choose unassigned time slots for its new assignment. Similarly, a node uses its NM in responding to time slot assignment requests from other nodes; a node is generally forbidden from permitting a new time slot assignment if that time slot is already assigned in its own NM. In the medium access control disclosed in the present document, the indicator (e.g., assignment index) corresponding to a time slot of the superframe in a device's NM distinguishes among the device's scheduled use of the time slot for control packet transmission or reception, the device's scheduled use of the time slot for data packet transmission or reception, and no scheduled use of the time slot by the device.

NapMap Embodiment

Described below is an embodiment, which will be referred to as the NapMap protocol in this disclosure, of communicating through a wireless tree-topology network with the medium access control being disclosed. In this embodiment, network nodes form a logical tree topology that has one root node, and all non-root nodes transport their application data to the root node. Such a communicating arrangement can be found in sensor networks wherein nodes report their sensor data to a single collection point node. A tree topology together with the root node designation defines the parent-child relation between some pairs of nodes. A pair of nodes connected by an edge of the logical tree topology is said to be in the parent-child relation. The root node is a parent of every node that is connected to the root node by an edge (in the tree topology), and every node that is connected to the root node is a child of the root node. Two non-root nodes connected to each other by an edge is in the parent-child relation. Between such a pair of nodes, the node that is one-hop closer to the root node in the tree topology is defined as the parent, and the node that is one-hop farther from the root node is defined as the child. In this embodiment, the root node will be also referred to as the data sink because it is the final destination of all application data originated from the nodes. In this disclosure, two nodes that are connected by an edge in the logical tree topology are defined as adjacent. In a tree topology with one root designated, adjacent nodes are in the parent-child relation, with one node being the parent and the other node the child. In this disclosure, it is assumed that adjacent nodes are within the radio range of each other. The tree topology can be formed by the devices in a distributed manner by the devices' network joining procedure, which will be described later.

Once the logical tree topology is established with the data sink node as the root, routing paths for application data transports are naturally decided. Every non-root node can send data messages originated from it to its parent node. In addition, each non-root node forwards the data messages received from its child node to its parent node. That is, a parent node routes data upstream (toward the root) for its child node and all its descendants. Because there is only a single path between any pair of nodes in a tree, the data path from each node to the root is determined when the network is formed with the logical tree topology. During the application data collection operation, each node simply forwards the received application data packets to its parent node in the logical tree.

The NapMap protocol is a slotted protocol with a superframe structure. All nodes are synchronized to a common superframe timing. This can be achieved by individual nodes synchronizing their clock to their respective parents' clock. A time slot can be assigned for a number of different purposes. For example, a time slot can be assigned for a node to transmit its beacon, to receive a control message from its parent, to receive a control message from its child, to transmit an application data message, or to receive an application data message from another node. If a time slot is assigned for a node to transmit its beacon, that time slot is referred to as the node's beacon time slot in this disclosure. If a time slot is assigned for a node to receive a control message from its child, that time slot is referred to as the node's Open-receive1 (OR1) time slot in this disclosure. If a time slot is assigned for a node to receive a control message from its parent, that time slot is referred to as the node's Open-receive2 (OR2) time slot in this disclosure.

<Control Time Slots>

In NapMap, each node designates three time slots for transmitting or receiving control packets: namely, beacon time slot, Open-receive1 (OR1) time slot, and Open-receive2 (OR2) time slot. Each node transmits its beacon once per superframe in its beacon time slot. A node is awake in its own beacon time slot to transmit its beacon. The node can choose its own beacon time slot when joining the network. When a node joins the network, it listens to the beacons of the other nodes in its neighborhood. Using this information, the joining node can choose a beacon time slot that is different from the other nodes' control time slots. Since the beacon is a broadcast message, no acknowledgement is expected.

In each superframe, each node is awake in a specific time slot to receive control messages from its child nodes or nodes that want to be its children—the node's Open-receive 1 (listen-to-children) time slot. Each node can choose its own OR1 (listen-to-children) time slot when joining the network. A node is awake during this time slot even if it does not currently have any children because nodes attempting to join the network at that node will send requests in that node's OR1 time slot. A node's beacon contains information on its OR1 time slot. Thus, any node that receives a beacon is also informed of the beacon-sending node's OR1 time slot. Examples of control messages that could be received during the OR1 time slot are a node's request for joining the network or a child node's request for transmitting data upstream. For example, if node C wants to join the network by making node B as its parent, node C sends the request to join in node B's open-receive1 time slot. If node B is already the parent of node C and node C wants to reserve a time slot or time slots in which to transmit application data, the request for transmission is sent in node B's open-receive1 time slot. Because a node can be simultaneously adjacent to more than one other node, a node can simultaneously be in more than one parent-child relation, thus a node can have more than one child (but a node can only have at most one parent in a logical tree topology). Because a node can have more than one child, packet collisions due to contention between children trying to simultaneously transmit during the node's OR1 time slot are normal and expected. A child transmitting a packet during its parent's OR1 time slot expects an acknowledgement; a missing acknowledgement indicates a lost message, lost acknowledgement or a collision. Regardless of the cause, depending on the specific message transmitted, a child can retry the transmission after performing an exponential back-off. Various messages can be sent from a child node to its parent during the parent's OR1 time slot. In addition, a node may occasionally receive a packet from non-adjacent neighbors (Recall that in the present disclosure, two nodes are said to be adjacent if they are in a parent-child relationship in the tree topology. A node's non-adjacent neighbors are other nodes that are within radio range (neighbors) but that are not in a parent-child relationship with the node.) during its OR1 time slot. Messages that can be received during OR1 time slots include:

Network joining: request to join a network
Application time slot negotiation: request an application time slot assignment A node's Open-receive2 (listen-to-parent) time slot is for receiving control messages from its parent. When a node receives a packet during its OR2 time slot, it replies with an acknowledgement. Because the root node has no parent, it does not have an OR2 time slot.

Messages that can be received during OR2 time slots include:
Network joining: node is allowed to join, node is denied from joining, notification that a new node has joined
Application time slot negotiation: message of granting an application time slot request, an order to cancel a previous application time slot assignment A node that has sent a request to join the network or a node that has sent a request for a time slot reservation to its parent is supposed to receive a response to that request. After making the request, the requesting node should be awake in its OR2 time slot in order to receive the response message. Each node can choose its own OR2 time slot when joining the network. A request message to join a network carries information about the OR2 time slot of the requesting node. Therefore, any node that receives a request to join message knows in which time slot to send the response.

<Application (Data) Time Slots>

Before a node can use a time slot to transmit application data, it requests permission to use that time slot. Successfully negotiated and granted application time slots are referred to as a node's reserved time slots in this disclosure. These application time slots can be used by a node to transmit or receive data (application) packets. A reserved time slot is reserved by both parent and child: the child transmits a packet containing application data, and the parent receives this packet and responds with an acknowledgement. After a node has finished with the application time slot, it releases the reservation, allowing another node to reserve the time slot in the subsequent superframes. Altering application time slot assignments is a normal part of the protocol operation, and can happen often. Because application time slots cannot be assigned without first obtaining permission, a parent node is able to exert much control over its children's data transfer. A parent node can prevent packet collisions among its children who intend to send application data upstream by ensuring that individual children are assigned different application time slots. Additionally, because negotiations and reservations occur between each parent-child pair, the NapMap protocol naturally facilitates congestion control mechanisms—a parent can simply refuse to grant permission to a child for using an application time slot, effectively stopping any application data transfer.

<Protocol Data Units (PDUs)>

In a NapMap embodiment, nodes exchange protocol data units (PDUs) while supporting application data transport toward the root node. There are different types of PDUs in the NapMap protocol, and the messages sent in the control plane can be organized into four groups: PDUs for network joining, ongoing neighborhood operations, application time slot negotiations, and conflict resolution.

Network joining PDUs include messages to request to join, allow a node to join, deny a node from joining, and to notify neighbors of a newly joined node's arrival.

The most important PDU used for ongoing neighborhood operations is the Beacon PDU. The beacon PDU is a node's primary method of announcing its presence to other nodes. The Beacon PDU is also used for clock synchronization and for sending a node's NM to its neighbors. A node's beacon contains the indexes of the node's own control time slots (so that other nodes will know how to communicate with the node if needed), along with the node's current neighborhood map and the node's current list of neighbors (LON). Transmitting one's own beacons and receiving neighbors' beacons is the primary method of distributing neighborhood maps throughout a NapMap network. This NM distribution, along with the subsequent NM updates, is the method of cooperatively disseminating time slot assignment information among all nodes.

The application time slot negotiation PDUs include messages to request an application time slot assignment, grant a request, and cancel a previous application time slot assignment.

The conflict resolution PDUs include messages to notify nodes of identified conflicts and messages to resolve conflicts by cancelling or changing time slot assignments.

In addition to the control PDUs described above, application data PDUs are used for transferring application data to the root node. All control PDUs are sent in control time slots and all application data PDUs are sent in application time slots.

<Common Time Slot Elements>

The NapMap protocol is a slotted protocol with a superframe structure. All nodes are synchronized to a common superframe, and individual nodes are synchronized to their parents' clock. However, because of hardware differences, clock synchronization may not be exact when implemented. Differences in timekeeping can cause nodes to have small differences in the boundaries of time slots. To compensate for these differences, the protocol defines a fixed guard interval, denoted $T_g$. If a node is scheduled to listen for or receive a packet in time slot i, then the node must begin listening at least $T_g$ before the beginning of time slot i. Similarly, any transmissions in a time slot must be completed no later than $T_g$ before the end of that time slot.

In the NapMap embodiment, PDUs other than the Beacon PDU expect an acknowledgement from the receiving node back to the sending node. Acknowledgements are sent immediately after reception of a PDU has successfully completed. Since acknowledgements have a fixed size, the time to send an acknowledgement is fixed, denoted $T_{ack}$. When an acknowledgement is expected, the node that transmitted the PDU must switch to receiving mode and listen for an acknowledgement immediately after the packet transmission is complete. Similarly, the node that received the PDU must switch to transmit mode and send an acknowledgement back to the source after packet reception is successfully completed.

In the NapMap embodiment, all time slots are of the same duration. However, a time slot, based on the purpose of its assignment, can take different formats. For the duration of the assignment of carrying a particular kind of messages, the time slot format appropriate for the kind of message applies. Because a single time slot can have different assignments belonging to different nodes that are not within the radio range (owing to spatial time slot reuse), it is possible that a time slot can have more than one format simultaneously in different physical locations. Nodes exchange protocol data units (PDUs) in time slots; in a single time slot, a node may validly transmit one or more PDUs, and a node may validly receive one or more PDUs from exactly one node.

<Application Time Slot Format>

Application time slots are used for the transfer of application data PDUs between nodes. In this disclosure, a transaction is defined as a PDU transmission/reception followed by an acknowledgement. Recall that an acknowledgement is only sent after successful transmission and reception of a PDU. A successfully completed transaction is the successful transmission and reception of a PDU, followed by the successful transmission and reception of an acknowledgement. The duration of a transaction can vary because the size of an application data PDU is application-dependent. However, a single time slot must be long enough to contain a transaction of a maximum-length application data PDU, along with a silent guard interval, $T_g$.

A single application time slot contains one or more transactions followed by a guard interval. The basic application time slot format, shown in FIG. 1, contains one transaction. The first transaction begins at the start of an application time slot, so it is the transmitting node's responsibility to be ready for transmission at the beginning of a time slot.

Figures 1, 2:
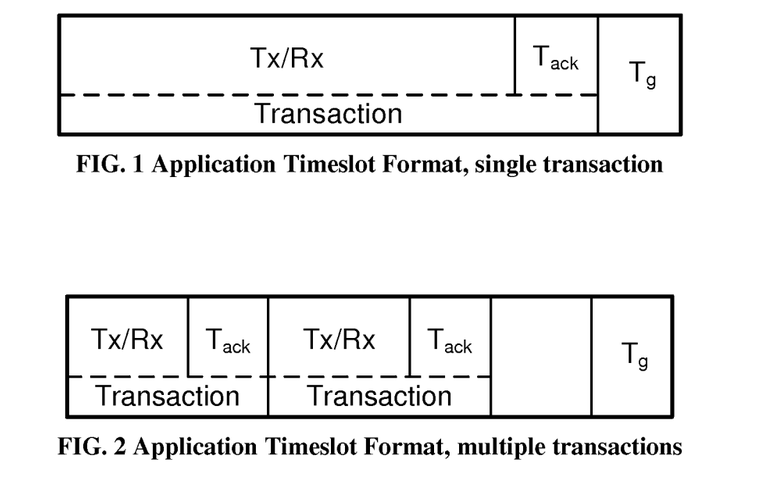
FIG. 1 illustrates the basic application timeslot format with single transaction
FIG. 2 illustrates multiple transactions in an application time slot

A single application time slot can contain more than one transaction, provided that the final transaction completes before the beginning of the guard interval. Since the transmitting node knows the current time, the size of the packet to be transmitted, and $T_{ack}$, the transmitting node can calculate when the transaction would be completed, and therefore can determine if the current time slot can accommodate an additional transaction. There is no limit to the number of transactions that can be performed within a single application time slot, but all transactions must be completed before the beginning of the guard interval. For example, if a node is transmitting large application data PDUs, then it may only be able to perform one transaction in an application time slot; if a node is transmitting small application data PDUs, then it may be able to perform many transactions in a single application time slot, as shown in FIG. 2. However, in this embodiment, a node is only permitted to begin an additional transaction if the previous transaction was completed successfully. If the transmitting node does not successfully receive an acknowledgement, then the node cannot perform any additional transactions for the remainder of that time slot, even if the time slot can accommodate more transactions.

<Beacon Time Slot Format>

Figure 3:
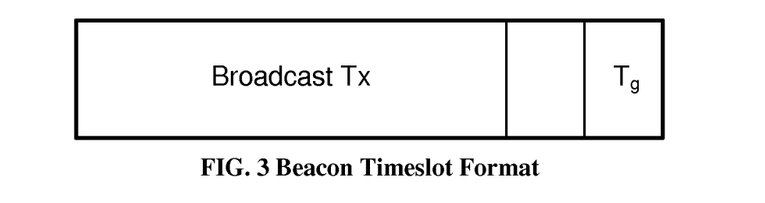
FIG. 3 illustrates beacon timeslot format

The beacon time slot format, shown in FIG. 3, contains a period of broadcast transmission and reception of a node's beacon PDU, followed by the guard interval. The beacon-sending node broadcasts its own beacon at the beginning of the time slot, but no acknowledgement is required because all beacon transmissions are broadcasts.

<OR1 Time Slot Format, Mini-slots>

The PDUs sent during the OR1 time slots are short compared with the maximum length of an application data packet. Since all time slots are of the same duration (in this embodiment), the duration of an OR1 time slot is longer than the duration of control PDUs. A node's OR1 time slot can be a point of high contention in a NapMap network, especially if the node has many children. Additionally, PDUs sent during OR1 time slots are of critical importance to the functioning of a network (network joining and time slot negotiation). Thus, OR1 time slots have a format different from application time slots.

Figure 4:
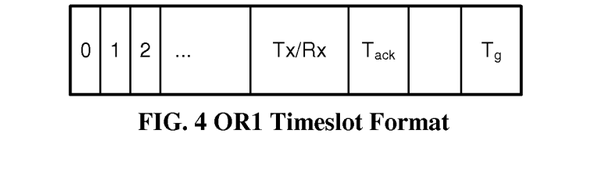
FIG. 4 illustrates OR1 timeslot format

The beginning part of an OR1 time slot, as illustrated in FIG. 4, is divided into (more than one) mini-slots. Each mini-slot is of the same duration. The exact number of mini-slots is an operational parameter, but there must be enough time remaining to accommodate the largest PDU sent during an OR1 time slot. The mini-slots are a simple mechanism to reduce the probability of collision. When node N intends to transmit during node V's OR1 time slot, node N chooses one mini-slot and starts listening for other transmissions from the beginning of the OR1 time slot. If no other transmissions are sensed by the time that node N's chosen mini-slot has arrived, then node N begins transmitting its PDU to node V as usual. However, if another node Q chooses a mini-slot that comes before node N's mini-slot, then node Q will begin transmitting to node V before node N, and node N will hear node Q's transmission and postpone its own transmission to node V. If a node postpones its transmission, then it repeats the process at the next superframe.

The mini-slots are intended to reduce collisions between children, but collisions can still occur. If two children are not within mutual radio range, then they will not be able to hear each other's transmissions (an instance of the hidden terminal problem), defeating the channel sensing mechanism. If two (or more) children select the same mini-slot, then their transmissions will collide; this possibility can be reduced by having more mini-slots. However, increasing the number of mini-slots forces a node to be awake for a longer time before being able to recognize that an OR1 time slot is unused, increasing its energy consumption. This embodiment does not require a specific policy for nodes to choose their mini-slots; as an example, nodes could randomly choose a mini-slot.

<OR2 Time Slot Format, Priority>

Figure 5:
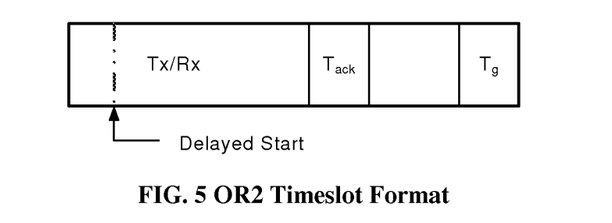
FIG. 5 illustrates OR2 timeslot format

The OR2 time slot format is illustrated in FIG. 5. The vast majority of packets a node receives during its OR2 time slot are PDUs from the node's parent. However, other neighbor nodes can also send packets during the node's OR2 time slot, potentially colliding with transmissions from the node's parent. In this embodiment, PDUs from a node's parent are given priority over PDUs from other nodes, so from a parent node's perspective, its children's OR2 time slots have the same format as application time slots (with only one transaction) and transmissions can start at the beginning of the time slot. All other nodes wishing to transmit during a node's OR2 time slot must start their transmissions after a short delay. If a node hears another transmission during this delay, then the node must postpone its own transmission because the parent is transmitting. If a node is forced to postpone its transmission, then the node repeats the process at the next superframe.

<Distributed Time Slot Scheduling>

Nodes participating in a NapMap network assign time slots in a distributed fashion with no centralized coordination. Nodes assign time slots using only local knowledge gained by communicating with only neighbor nodes. Time slots are assigned in a manner that tries to avoid packet collisions. However, due to the local nature of information based on which the time slot assignment decisions are made, packet collisions can occur because of the possibility of conflicting time slot assignments. In addition, packet collisions can also occur because of contention over a shared resource (e.g. a node's OR1 time slot). Packet collisions due to contention between nodes can be handled using standard retry mechanisms. Conflicting time slot assignments can occur if there are large delays in successfully exchanging neighborhood map information between nodes. In this disclosure, a conflict is defined as a combination of assignment indexes in the neighborhood maps of two or more nodes that could result in packet collisions. The NapMap protocol provides procedures to identify and resolve these conflicts; thus, any conflicting time slot assignments are only temporary. Identifying and resolving the existing conflicts within the network operation is a special ability the present embodiment disclosed.

<Collision/Failure Resolution>

The main collision avoidance technique in the NapMap protocol is the timely distribution of neighborhood maps, causing each node to have an accurate awareness of its neighborhood's time slot assignments. Despite the best efforts in distributing neighborhood maps, collisions and lost packets are inevitable, thus, the NapMap protocol has a provision for retrying transmissions. When a collision is detected (if possible, otherwise a lost packet can be considered a collided packet), the transmitting node may attempt to retry after executing a binary exponential backoff. The maximum backoff duration is an operational parameter. The backoffs occur over superframes. If a collision occurs during a node's application time slot, a backoff and retry may not be necessary if the node is able to successfully transmit its application data in other (reserved) application time slots.

<Carrier Sensing>

To help reduce collisions, nodes can sense the channel for a short time before transmitting. The duration of sensing may be random (OR1 mini-slots case), providing jitter to the start of transmission. This jitter is intentional, so that two neighboring nodes scheduled to transmit during the same time slot will not collide. Ideally, one node will start transmitting slightly before the other, allowing the other node to sense the transmission and avoid the collision. If a node senses a busy channel, then the node cancels its transmission and may optionally try again at the next superframe. A backoff is not required because before transmitting at the next superframe, the node will carrier sense again, so there is no harm in not backing off. Carrier sensing could be employed for every time slot, but this might cause performance loss because time spent sensing the channel takes away from time that could be spent transmitting data. Furthermore, in the ideal case, collisions in application time slots should never happen because of proper notification from the neighborhood maps.

<Failure Counters>

Many operations in the NapMap protocol require a two-way handshake between pairs of nodes. At the most basic level, transmitting a single packet requires an acknowledgement from the receiver back to the sender. At a slightly higher level, joining a network requires a two-way negotiation between the new node and its potential parent. After joining a network, a node is required to negotiate a reserved time slot before it can transmit an application data packet. A node can keep counters of various failures and error events, such as missed acknowledgements, missed response PDUs, and missed beacons. Long strings of consecutive failures can be indicative of larger failures in the network, and a node could take corrective actions such as changing its parent node or considering a neighbor node as failed.

<Neighborhood Map: Assignment Index Interpretation>

The following interpretation of assignment index values is presented from the perspective of a node denoted by N. A particular assignment index value represents node N's perception of how the time slot has been assigned in its neighborhood; it is possible that this perception differs among the nodes in the same neighborhood and it is possible that this perception is incorrect (i.e. the actual time slot assignment is different from a node's perception). $M_N(f,i)$ denotes the assignment index of the ith slot during the fth superframe in node N's neighborhood map. In the NapMap embodiment, an assignment index can be one of the integer values {0, 1, 2, 3, 4}. Each of these integer values in $M_N(f,i)$ of node N's neighborhood map indicates specific (unique) information about the ith time slot's assignment from node N's point of view. Node N perceives time slot i of superframe f to be unassigned in its neighborhood if $M_N(f,i)=0$. Time slot i of superframe f is assigned to node N if $M_N(f,i)=4$ or $M_N(f,i)=2$. In a given superframe, it is possible for a time slot to be simultaneously assigned to more than one node in a neighborhood. Among the nodes in a neighborhood, some possible combinations of assignment indexes indicate conflicts and could lead to collisions, whereas other combinations of assignment indexes should be collision-free.

Assignment index=4: $M_N(f,i)=4$ indicates that node N has been assigned this time slot for transmitting or receiving a control packet. A node uses its beacon control time slot to transmit its beacon PDU, its OR1 control time slot to receive PDUs from its children, and its OR2 control time slot to receive PDUs from its parent. In the NapMap embodiment, an assignment index value of 4 does not specify for which type of control time slot that the time slot is being used. If $M_N(f,i)=4$, then node N could be transmitting or receiving a control packet in time slot i.

Assignment index=3 generally indicates that this time slot has been assigned as a neighbor node's control time slot. For example, $M_N(f,i)=3$ indicates that node N perceives time slot i as assigned to some node V in node N's neighborhood, for node V to transmit or receive a control packet. Similar to assignment index value of 4, an assignment index value of 3 does not indicate for which type of control time slot that a neighbor node is using the time slot. Therefore, if $M_N(f,i)=3$, then node N could be transmitting or receiving in time slot i. If timeslot i is being used as node V's beacon time slot, then node N could be receiving node V's beacon PDU in the time slot. Otherwise, time slot i is being used as node V's OR1 or OR2 time slot, and node N could be transmitting a control PDU to node V in the time slot.

Assignment index=2 indicates that this time slot has been assigned as a node's own reserved time slot. For example, $M_N(f,i)=2$ indicates that time slot i in superframe f is reserved for node N to transmit or receive application data. In the NapMap embodiment, $M_N(f,i)=2$ does not specify whether node N is scheduled to transmit or receive data. If node N was granted permission to transmit its application data in time slot i, then $M_N(f,i)$ is set to 2 and node N could be transmitting a PDU to its parent in the time slot. If node N has granted permission to its child node V to use time slot i, then $M_N(f,i)$ is set to 2 and node N could be receiving a PDU from its child (node V) in the time slot.

Assignment index=1 generally indicates that this time slot has already been assigned to another node and cannot currently be assigned to this node without causing a conflict. For example, $M_N(f,i)=1$ indicates the following possibilities in node N's perception:

Time slot i is an application timeslot reserved for some neighbor node V, and this reservation does not involve node N. (Note that if nodes N and V are adjacent and both nodes have assigned time slot i as their own reserved time slot to communicate with each other, then node N's assignment index is supposed to be 2 instead of 1.)

or,

Time slot i has been assigned to some node K as its own control time slot, where node K is not within node N's neighborhood but is within node V's neighborhood for some node V that is also a neighbor of node N. (Note that if node K were also a neighbor of node N and had assigned timeslot i as its own control time slot, then node N's assignment index would supposed to be 3 instead of 1.)

Assignment index=0 generally indicates that this time slot can be newly assigned to the node. Particularly, $M_N(f,i)=0$ indicates that none of node N's neighbors has been assigned with time slot i as a control or application time slot (i.e., indicating that no neighbor node, denoted V, has $M_V(f,i)=4$ or $M_V(f,i)=2$), and that node N can thus request this time slot for its own control or application timeslot. Furthermore, $M_N(f,i)=0$ indicates that none of node N's neighbors' neighbors have been assigned timeslot i as a control time slot (otherwise, $M_N(f,i)$ would supposed to be 1 instead of 0). If some neighbor node V has $M_V(f,i)=4$, 3, or 2, then $M_N(f,i)$ would not be 0. An assignment index of 0 allows a node to request an assignment (e.g., to its parent during normal operations or to its potential parent when joining the network) for that time slot. Depending on the assignment, the node could use the time slot to transmit or receive.

<Neighborhood Map Normal Update Rules>

A NapMap network is dynamic, and as such, the neighborhood map (NM) must be updated and maintained to reflect the changing environment. A node does not exist in isolation, and its neighbors' actions become reflected in its own NM. Each node N is required to store and update its own neighborhood map, denoted $M_N$. Initially, all entries (assignment indexes) in a node's NM are set to 0. During normal network operations, a node updates its NM in response to its actions and in response to receiving a neighbor's NM. Neighborhood maps are primarily received via neighbors' beacon PDUs, but a node can also receive a NM in certain other PDUs. In the following cases, a node is able to immediately update its own NM:

When a node, say node N, first successfully joins the network, node N decides what time slots of the superframe will be its own control timeslots and sets the assignment indexes of its control time slots to 4.

When node N grants a reserved time slot to its child, node N sets the assignment index of the reserved time slot to 2 in its neighborhood map, $M_N$. When a node, say node V, is granted a reserved time slot from its parent, node V sets the assignment index of the reserved time slot to 2 in its neighborhood map, $M_V$.

Under certain circumstances, a parent node may want to rescind previous reservations granted to a child node. An example of such circumstance is detecting a conflicting reservation. Another example would be the parent's packet buffer overflowing or its available buffer space being close to 0, which could prompt the parent to reduce the incoming traffic (congestion control). To cancel a previous reservation, a parent node sends a cancellation PDU to its child. When node N sends a cancellation PDU to its child, node N sets the assignment indexes of the former reserved time slots to 0. Similarly, when a node V receives a cancellation PDU from its parent, node V sets the assignment indexes of the former reserved time slots to 0.

In the NapMap embodiment, child nodes are responsible for requesting application time slots as needed, and child nodes are also primarily responsible for cancelling reservations when they are no longer needed. When node N receives a cancellation PDU from its child, node N sets the assignment indexes of the former reserved time slots to 0. Similarly, when a node V sends a cancellation PDU to its parent, node V sets the assignment indexes of the former reserved time slots to 0.

A node transmits its own neighborhood map via its own beacon PDU; a node receives its neighbors' neighborhood maps by selectively listening to their beacons; a node updates its own neighborhood map when another neighborhood map is received. Through these cooperative actions of nodes, the effects of time slot assignments are propagated throughout the network. Assume that a node N has assigned time slot i as its own control time slot, setting its assignment index for time slot i to 4. Through the beaconing, receiving, and updating processes, information about node N's assignment index for time slot i will travel to node N's neighbors and could cause changes in the neighborhood maps of node N's neighbors. Subsequently, node N's neighbor V will send its updated NM to its neighbors, and the neighborhood maps of node V's neighbors could be affected by the new values of node V's NM, etc. Since the NapMap protocol allows for spatial time slot reuse, nodes that are sufficiently distant from node N should also be able to assign time slot i for their own use, independent of node N's assignment. Propagation of information about node N's assignment index for time slot i may modify the assignment index for time slot i in the other nodes' neighborhood maps.

Let us consider two neighboring nodes, N and V. Each node updates its own NM, $M_N$ and $M_V$ respectively. Suppose node V transmits its neighborhood map ($M_V f$) for superframe f, and it is received by node N. For expository purposes, we denote by $r_{N,V} f$ the message of $M_V f$ received at node N. We are making this notational distinction between $M_V f$ and $r_{N,V} f$ because the channel can introduce bit errors. At the instant of successful, error-free reception, $r_{N,V} f$ should be identical to $M_V f$. Upon receiving node V's NM, node N updates its own neighborhood map ($M_N$) by considering each assignment index separately and performing the following procedure for each assignment index i:

$$M_N(f,i):=\max[M_N(f,i),u(r_{N,V}(f,i))], \quad (1)$$

where function u( ) is defined as u(4)=3, u(3)=1, u(2)=1, u(1)=0, u(0)=0. The above update rules apply after a node has successfully joined the network. Prior to joining, slightly different NM update rules are used.

<Time Slot Assignment Conflict Detection and Resolutions>

A conflict is said to occur when two or more nodes have a single time slot assigned for different purposes that could result in a packet collision. The NapMap protocol relies on NM and LON (List of Neighbors) distribution (primarily through beaconing) to detect these conflicts. When a node receives a NM, the node processes the received NM according to the normal update rules. During this element-wise processing, a node compares the assignment index from its own NM with the assignment index of the received NM, and specific combinations of assignment indexes indicate conflicts between the NM-receiving node and the NM-sending node. If any conflict between the NM-sending node and NM-receiving node is identified, the NM-receiving node performs the corresponding conflict resolution steps. The conflict detection rules only uses information saved locally to a node, together with a received NM and LON (List of Neighbors) from a neighboring node. By applying the conflict detection rules, a NM-receiving node is able to identify conflicts that currently exist between itself and the NM-sending node (clearly NM-sending node is one of the neighbors of the NM-receiving node). As a node receives beacons from its neighbors over time, a node is able to identify conflicts in which it may be involved.

The situations described in the following paragraphs address an event that node N receives a NM and LON from its neighbor node, V, and focus on node N's perception about the assignment of time slot i in its neighborhood. The conflict detection rules and resolution procedures are all described from the perspective of node N. The assignment index from node N's NM is denoted $M_N(f,i)$ and the assignment index from the received NM is denoted $r_{N,V}(f,i)$; node N's LON is denoted $L_N f$ and the received LON is denoted $q_{N,V} f$.

$M_N(f,i)=0$, $r_{N,V}(f,i)=0/1/2/3/4$: This case does not indicate a conflict between N and V because node N does not perceive time slot i as assigned to multiple nodes (N and V) resulting in packet collision. $M_N(f,i)=0$ indicates that time slot i has not been assigned to node N and thus N is not involved in any packet collision situation during time slot i. In this case, node N simply follows the normal update rules to update the assignment index of time slot i in its own NM.

$M_N(f,i)=1$, $r_{N,V}(f,i)=0/1/2/3/4$: This case does not indicate a conflict between N and V because $M_N(f,i)=1$ indicates that time slot i has not been assigned to node N and thus N is not directly involved in any packet collision situation during time slot i. In this case, node N simply follows the normal update rules to update the assignment index of timeslot i in its own NM.

$M_N(f,i)=2$, $r_{N,V}(f,i)=0/1$: This case does not indicate a conflict between N and V because $r_{N,V}(f,i)=0/1$ (or $M_V(f,i)=0/1$) indicates that time slot i has not been assigned to node V and thus V is not involved in any packet collision situation during time slot i. In this case, node N simply follows the normal update rules to update the assignment index of time slot i in its own NM, thus $M_N(f,i)$ remains at 2.

$M_N(f,i)=2$, $r_{N,V}(f,i)=2$: Unless N and V have already established time slot i as a reserved time slot for data transmission between N and V, this case indicates a conflict between N and V. Node N can easily decide whether its reservation is for communication with V. If time slot i has been reserved by N for communication with V, then N decides that there is no conflict. If time slot i has been reserved by N for communication with some other node than V, then N decides that it is in conflict with node V. In the case of a conflict, node N will cancel its reservation.

$M_N(f,i)=2$, $r_{N,V}(f,i)=3/4$: $M_N(f,i)=2$ indicates that time slot i has been assigned as N's application time slot and $r_{N,V}(f,i)=3/4$ indicates that time slot i is a control time slot for V (the case of $r_{N,V}(f,i)=4$), or is a control time slot for some neighbor of V (the case of $r_{N,V}(f,i)=3$). This case does indicate a conflict between N and V because nodes N and V have time slot i assigned for different purposes that could result in a packet collision. In this case, Node N will cancel its reservation.

$M_N(f,i)=3$, $r_{N,V}(f,i)=2$: $M_N(f,i)=3$ indicates that time slot i is a control time slot for some neighbor of node N, say node K, and $r_{N,V}(f,i)=2$ indicates that V has assigned time slot i as its own application time slot. This case indicates a conflict between N and V because nodes N and V have time slot i assigned for different purposes that could result in a packet collision. In this case, node notifies N notifies V to cancel its reservation.

$M_N(f,i)=3$, $r_{N,V}(f,i)=3$: This may or may not indicate a conflict between N and V. $M_N(f,i)=3$ indicates that time slot i is a control time slot for some neighbor of node N, say node K ($M_K(f,i)=4$), and $r_{N,V}(f,i)=3$ indicates that time slot i is a control time slot for some neighbor of V, say node U ($M_U(f,i)=4$). If node N and node V have only one mutual neighbor with control time slot i, i.e. U and K are indeed one node with control time slot i, then there is no conflict between N and V. Node N consults its LON ($L_N f$) and the received LON ($q_{N,V} f$) to determine if U and K are the same node or not. In the case of a conflict, node N will notify node K to change its control time slot.

$M_N(f,i)=3$, $r_{N,V}(f,i)=4$: This may or may not indicate a conflict between N and V. $M_N(f,i)=3$ indicates that time slot i is a control time slot for some neighbor of node N, say node K, and $r_{N,V}(f,i)=4$ indicates that node V has been assigned with time slot i for its control time slot. To avoid packet collisions, at most one node per neighborhood is permitted to have a particular time slot assigned as a control time slot. If node V is the only one in node N's neighborhood with assignment index=4 for time slot i, i.e. K and V are indeed one node, then there is no conflict between N and V. Node N consults its LON ($L_N f$) to determine if K and V are the same node or not. In the case of a conflict, node N will notify node V to change its control time slot.

$M_N(f,i)=4$, $r_{N,V}(f,i)=0/1$: This case does not indicate a conflict between N and V because $r_{N,V}(f,i)=0/1$ (or $M_V(f,i)=0/1$) indicates that time slot i has not been assigned to node V and thus V is not involved in any packet collision situation during time slot i. In this case, node N simply follows the normal update rules to update the assignment index of time slot i in its own NM, thus $M_N(f,i)$ remains at 4.

$M_N(f,i)=4$, $r_{N,V}(f,i)=2$: This case indicates a conflict between N's control time slot and V's application time slot. Both V and N, which are within range of each other, could be transmitting during time slot i (e.g. transmitting a PDU or an acknowledgement), leading to packet collisions. In order to resolve the conflict, N requests V to cancel its reservation. However, if node V does not cancel its own reservation for any reason (such as not receiving the notification from node N) after a specific time period, node N may change its own control time slot. The length of the specific time period that node N can wait before being forced to change its control time slot is an operational parameter.

$M_N(f,i)=4$, $r_{N,V}(f,i)=3$: This may or may not indicate a conflict between N and V. In normal operation, when node N sets assignment index=4 for time slot i, N's neighbors (including N's children) update their own NM upon receiving N's NM. For example, suppose that $M_V(d,i)=0$ (d<f). Upon receiving $r_{V,N}(e,i)=4$ (d<e<f), V updates $M_V(e,i)=3$ at superframe e. In this case, receiving the updated value of $r_{N,V}(f,i)=3$ by N at superframe f (when $M_N(f,i)=4$) indicates a normal operation because $r_{N,V}(f,i)=3$ is the direct result of N's NM propagation in previous superframes. On the other hand, suppose that node K is a neighbor of V, but K is not a neighbor of N, and further suppose that $M_K(d,i)=4$. Following the previous sequence of updates, V updates $M_V(e,i)=3$ at superframe e and N receives $r_{N,V}(f,i)=3$ at superframe f, but now N and V are in a conflict. To distinguish between these two possibilities, node N consults $q_{N,V} f$ to determine if K and N are the same node or not. In the case of a conflict, node N will change its control time slot assignment.

$M_N(f,i)=4$, $r_{N,V}(f,i)=4$: This case clearly indicates a conflict between N and V because both nodes N and V, which are in the radio range of each other, use time slot i as their own control time slots. In order to resolve the conflict, node N will change its control time slot assignment because both nodes N and V share the same control time slot.

<Network Joining Procedure>

Other than the root node, every node must join a NapMap network according to the following joining procedure. The root node simply initializes its NM to all zeros, selects its control time slots, and begins transmitting beacons.

<Step 1: NM Initialization and Neighbor Discovery>

When a node N wants to join a NapMap network, it initializes its NM to all zeros and performs at least one superframe scan (i.e. is awake and listens for packets in every time slot in a superframe). Ideally, more than one superframe scan could be performed because a neighbor's beacon can easily be lost due to temporary environmental factors. These initial scans are critical to discovering a node's neighbors, and awareness of all neighbors is critical to avoiding collisions.

During the joining process, node N maintains an additional temporary NM (the joining neighborhood map), denoted $J_N$. Similar to the normal NM, all entries in the joining NM are initially set to value zero. As node N listens to each time slot and receives neighboring nodes' beacons, it updates $M_N$ according to the normal update rules described earlier. In addition, node N updates $J_N$ according to a modified update rule: u(1)=1; while u(4)=3, u(3)=1, u(2)=1, and u(0)=0 as before.

The joining NM is only used during the network joining procedure.

<Step 2: Parent Selection and Join Request>

After scanning the superframe and discovering its neighbors, node N selects its own control time slots from the unassigned time slots (assignment index=0) in $J_N$ and a potential parent node P. With the required decisions made, N sends a request to join PDU to node P at P's OR1 time slot. Node N then listens for a reply from P at its own selected OR2 time slot.

When selecting its control time slots, node N must choose from the unassigned time slots (assignment index=0) in the joining NM ($J_N$), rather than the normal NM ($M_N$). Valid control timeslots for the newly joining node must be unassigned in both the new node's neighborhood and in each of its neighbors' neighborhoods. This is required because when the new node joins, all of the new node's neighbors will have the new node's control time slots changed to assignment index 3 in their respective neighborhood maps. If a timeslot has already been assigned elsewhere (assignment index=1), then changing to assignment index 3 will cause a conflict between the original assignment and the new node's control timeslot assignment.

<Step 3: Parent Reply>

After receiving the request-to-join PDU, potential parent node P must attempt to reply to node N, either allowing the join or denying it. A potential parent node can deny a node from joining the network for various reasons (for example, too many children have already joined at that node, the proposed control time slots are conflicting, or another join is already in progress). If node N does not receive a reply, or receives a negative reply, it can send a new request to join (to the same node) or select a new potential parent node. In case of not receiving of a reply, when sending a new request, node N may first perform a backoff procedure to help avoid any repetitive collisions with any other nodes that are also trying to join the network.

<Step 4: Neighbor Notification>

Once a positive reply is received from a potential parent P, node N has successfully joined the network, node N is adjacent to P, and is the child of P. As a member of the network, node N begins sending its beacon (containing $M_N$) during its beacon time slot and node N listens for all of its parent's beacons. Node N then notifies each of its neighbors by sending an arrival PDU to each of its neighbors at their OR2 time slots. Because of possible contention, this notification is only best effort, and retries might not be performed or are less vigorous. If a neighbor is not successfully notified, it will eventually detect the new node in a superframe scan (because the scanning node receives the new node's beacon in its own superframe scan). However, it could take numerous superframe scans before the new node is detected, thus successful neighbor notification is preferred. Neighbors that are notified can optionally listen more frequently for the new node's beacons. After the joining node sends a notification to each of its neighbors, the joining procedure is complete.

<Rejoining Procedure>

Due to various reasons, such as not receiving its parent's beacon in many consecutive superframes or to resolve a conflict, a node may be required to rejoin the network. In order to rejoin the NapMap network, a node must repeat all four steps of the joining procedure. Additionally, the rejoining node is required to select different control time slots than before. Depending on the reason for rejoining, the rejoining node may or may not decide to rejoin at the same parent node.

Other Details for Embodiment

<Integrating Downstream Traffic>

Although the NapMap embodiment did not describe downstream traffic (i.e. control and management traffic from root to non-root nodes), adding this feature should not be difficult. One method is to perform the application timeslot negotiation process in reverse, with a parent node requesting downstream timeslots from one of its children. The request would be sent in the child's OR2 timeslot and the reply would be received in the parent's OR1 timeslot.

Another possible method would be to temporarily use any existing reserved timeslots between a parent and child. Assuming that some reserved timeslots have already been negotiated, the parent could send a PDU to the child indicating that some or all of the reserved timeslots will be used for downstream traffic during the next superframe. Normally during reserved timeslots, the child node is transmitting while the parent node is receiving; for downstream traffic, the child node can simply receive while the parent node transmits. The parent's PDU can implicitly or explicitly specify the superframe during which the reserved timeslots would revert to normal (upstream) operation. This method obviously does not handle the case where no reserved timeslots have been negotiated between a parent-child pair; the prior method could be used then.

Broadcast downstream traffic can be easily handled by flooding the application data packets to every node. However, efficient unicast/multicast downstream traffic is more difficult because currently nodes do not contain any routing/forwarding tables. The NapMap embodiment can be extended such that nodes contain routing/forwarding tables for the downstream traffic.

<Idle Time Slot Sleeping>

When a node is listening during a time slot, it is required to be awake and ready to receive data $T_g$ before the beginning of the time slot. Although a node must be awake for the beginning of the time slot, it is not necessarily required to be awake for the entire duration of the time slot. If a node is able to determine that no further data will be sent during the remainder of the time slot, then it is permitted to sleep (turn off its radio) for the remaining time. For networks with long time slots, sleeping during these remaining time slot times can be a significant energy savings.

For timeslots with the application and beacon formats, a node can determine if the timeslot is unused after just $2T_g$. For OR1 timeslots, a node can safely sleep if it has not received the start of a packet $2T_g$ after the end of the last mini-slot. Similarly for OR2 timeslots, a node can sleep $2T_g$ after the delayed start.

<Variable Mini-slots and Mini-slot Selection Policy>

The number of mini-slots contained in a node's OR1 timeslot directly affects that node's energy usage because a node must be awake and listening for each mini-slot. Thus, more mini-slots mean that a node must wait longer before being able to determine that the timeslot is idle. The number of mini-slots is a tradeoff between potentially reducing collisions between child nodes and energy spent listening before sleeping for the remainder of an idle timeslot. If a node has few or no children, then it should probably have fewer mini-slots to conserve energy, whereas if a node has many children or if the children are highly contending over the node's OR1 timeslot, then the node should probably employ more mini-slots because the overall energy savings due to reduced collisions and retransmissions outweigh the additional costs for listening longer.

If the number of mini-slots in a node's OR1 time slot is a dynamic parameter, then the current value should be contained in the node's beacon. If the node reduces the number of mini-slots, then it is possible that child nodes are not immediately aware of the change and continue to use later mini-slots. This should not pose a problem because either they will see a busy channel (from packets starting earlier than the out-of-date later mini-slot) or their packet will not be received by the parent because it has gone to sleep (thinking the time slot is empty). In both cases, the child will eventually be updated by its parent's beacon.

A possible mini-slot selection policy would be to reserve the latest mini-slot for new nodes to attempt to join the network—if the OR1 time slot contains n mini-slots, then nodes would only use mini-slots [0 . . . n–2] and new nodes would send their join requests exclusively in mini-slot n–1. This effectively prioritizes existing node traffic over join requests and it also helps serialize simultaneous join requests because neighboring nodes attempting to join during the same time slot would be more likely to collide. After any collision, it is likely that one of the nodes would re-attempt to join before the other. The downside to this mini-slot selection policy is that the effective mini-slot capacity is always reduced by one, an ongoing performance penalty to accommodate relatively infrequent join events.

<Congestion Bit in ACKs>

As a simple congestion notification mechanism, a congestion bit can be added to acknowledgements for reserved timeslots.

<Measuring Time Slot Conditions>

In addition to other assignments in its neighborhood, a node can also consider the wireless environment when requesting and granting timeslots. Gathering information about the wireless environment requires a node to listen during unassigned timeslots, but a node's first priority should still be to conserve energy in unassigned timeslots. However, nodes are required to occasionally perform full superframe scans, during which they must be awake for an entire superframe. While scanning the superframe, a node can record information about each timeslot, such as received signal strength indicator (RSSI) and/or received channel power indicator (RCPI). If a supposedly unassigned timeslot has a strong noise measurement, then a node may prefer to request or grant other timeslots.

<Time Synchronization>

Time synchronization is required in the NapMap protocol, but it is possible to maintain synchronization with slower update rates. In the NapMap embodiment, time information is only carried in beacons; if time information was added to the acknowledgements of application data PDUs (and/or other packets like PDUs sent in OR1 time slots), then time synchronization via beacons may become less important.

<Mesh Topology>

The NapMap embodiment describes a tree-topology network. The NapMap protocol could simply be extended to support mesh topology networks by allowing for application time slot reservations between non-adjacent neighbors.

What is claimed is:

1. A method for communicating using a network including a plurality of devices, comprising:

partitioning medium access time into a series of superframes and partitioning each superframe into time slots;

scheduling by each of said devices its transmission and reception in the time slots of the superframe;

maintaining by each of said devices its neighborhood map, a neighborhood map being an ordered set of indicators corresponding to the time slots of the superframe, wherein the indicator distinguishes among the device's scheduled use of the corresponding time slot for a control packet transmission or reception, the device's scheduled use of the corresponding time slot for a data packet transmission or reception, and no scheduled use of the corresponding time slot by the device, and the indicator indicates whether the device is allowed to transmit in the corresponding time slot;

transmitting by each of said devices a packet containing said each device's neighborhood map recurrently;

updating recurrently by each of said devices its neighborhood map on the basis of information available to the device, wherein information available to the device includes the device's schedule of time slot uses, one or a plurality of neighborhood maps received from one or a plurality of other devices, and one or a plurality of control packets received from one or a plurality of other devices; and updating by each of said devices its schedule of packet transmission and reception on the basis of information available to the device, wherein information available to the device includes the device's transmission need, the device's neighborhood map, and one or a plurality of control packets received from one or plurality of other devices.

2. The method according to claim 1, wherein said each device designates one or a plurality of time slots in the superframe for transmitting a packet containing its neighborhood map.

3. The method according to claim 1, wherein each indicator in the neighborhood map of said each device takes one of five values corresponding to 0, 1, 2, 3, 4, and said maintaining of the neighborhood map includes:

setting the indicator to the value corresponding to 4 if said indicator's corresponding time slot is scheduled for said each device's transmitting or receiving a control packet;

setting the indicator to the value corresponding to 2 if said indicator's corresponding time slot is scheduled for said each device's transmitting or receiving a data packet; and setting the indicator to the value corresponding to 0 at the beginning of the medium access time.

4. The method according to claim 3, wherein said each device's updating its neighborhood map includes:

updating said each device's ith indicator to the value corresponding to 3 if said each device's ith indicator has a current value corresponding to a number less than 3 and said each device receives from another device a neighborhood map in which the ith indicator has the value corresponding to 4;

updating said each device's ith indicator to the value corresponding to 1 if said each device's ith indicator has a current value corresponding to 0 and said each device receives from another device a neighborhood map in which the ith indicator has the value corresponding to 3; and updating said each device's ith indicator to the value corresponding to 1 if said each device's ith indicator has a current value corresponding to 0 and said each device receives from another device a neighborhood map in which the ith indicator has the value corresponding to 2.

5. The method according to claim 1, wherein said each device detects a conflict on the basis of information available to the device, wherein the information available to the device includes its neighborhood map or a list of neighboring nodes and another device's neighborhood map received, wherein said each device resolves the detected conflict by modifying its transmission schedule and neighborhood map.

6. The method according to claim 1, wherein the devices form a tree topology and each data packet is routed from its source to destination through the path in the tree topology.

7. The method according to claim 1, further comprising forming by said devices a tree topology including one root node;

sending by each non-root node data packets originated from said each non-root node to said each non-root node's parent node, wherein said each non-root node's parent node is defined as the node that is one hop closer to the root node than said each node in said tree topology; and forwarding by each non-root node data packets received from one or a plurality of said each non-root node's child nodes to said each non-root node's parent node, wherein a child node of said each non-root node is defined as a node that is one hop farther from the root node than said non-root node in said tree topology.

8. The method according to claim 7, wherein said each device designates one or a plurality of time slots in the superframe for transmitting a packet containing its neighborhood map.

9. The method according to claim 8, wherein said each node designates one or a plurality of time slots for receiving a control packet from its child nodes or from nodes that are to be joined to said network, and each non-root node designates one or a plurality of time slots for receiving a control packet from its parent node.

10. The method according to claim 9, wherein scheduling of data packet transmission from a non-root node to its parent comprises:

selecting by said non-root node one or a plurality of proposed time slots for transmission to its parent;

sending by said non-root node to its parent a control packet containing the list of said proposed time slots during said parent's designated time slot for receiving a control packet from said parent's child nodes;

selecting by said parent node from said list of proposed time slots a set of permitted time slots; and sending by said parent node to said non-root node a control packet containing the list of said permitted time slots during said non-root node's designated time slot for receiving a control packet from said non-root node's parent.

11. The method according to claim 10, wherein each indicator in the neighborhood map of said each device takes one of five values corresponding to 0, 1, 2, 3, 4, and said maintaining of the neighborhood map includes:

setting the indicator to the value corresponding to 4 if said indicator's corresponding time slot is scheduled for said each device's transmitting or receiving a control packet;

setting the indicator to the value corresponding to 2 if said indicator's corresponding time slot is scheduled for said each device's transmitting or receiving a data packet; and setting the indicator to the value corresponding to 0 at the beginning of the medium access time.

12. The method according to claim 11, wherein said each device's updating its neighborhood map includes:

updating said each device's ith indicator to the value corresponding to 3 if said each device's ith indicator has a current value corresponding to a number less than 3 and said each device receives from another device a neighborhood map in which the ith indicator has the value corresponding to 4;

updating said each device's ith indicator to the value corresponding to 1 if said each device's ith indicator has a current value corresponding to 0 and said each device receives from another device a neighborhood map in which the ith indicator has the value corresponding to 3; and updating said each device's ith indicator to the value corresponding to 1 if said each device's ith indicator has a current value corresponding to 0 and said each device receives from another device a neighborhood map in which the ith indicator has the value corresponding to 2.

13. A network including a plurality of devices configured to partition medium access time into a series of superframes and partition each superframe into time slots schedule the devices' transmission and reception in the time slots of the superframe;

maintain neighborhood maps associated with individual devices, a neighborhood map being an ordered set of indicators corresponding to the time slots of the superframe, wherein the indicator of the neighborhood map distinguishes among the associated device's scheduled use of the corresponding time slot for a control packet transmission or reception, the associated device's scheduled use of the corresponding time slot for a data packet transmission or reception, and no scheduled use of the corresponding time slot by the associated device, and the indicator indicates whether the associated device is allowed to transmit in the corresponding time slot;

transmit packets containing individual devices' neighborhood maps recurrently;

update recurrently the neighborhood maps associated with individual devices on the basis of information available to the individual devices, wherein information available to an individual device includes the device's schedule of time slot uses, one or a plurality of neighborhood maps received from one or a plurality of other devices, and one or a plurality of control packets received from one or a plurality of other devices; and update individual devices' schedule of packet transmission and reception on the basis of information available to the individual devices, wherein information available to an individual node includes the device's transmission need, the device's neighborhood map, and one or a plurality of control packets received from one or plurality of other devices.

14. A network including a plurality of devices as in claim 13, wherein each of said devices designates one or a plurality of time slots in the superframe for transmitting a packet containing said each device's neighborhood map.

15. A network including a plurality of devices as in claim 13, wherein each indicator in each neighborhood map takes one of five values corresponding to 0, 1, 2, 3, 4, and maintaining of a neighborhood map includes:
- setting the indicator to the value corresponding to 4 if said indicator's corresponding time slot is scheduled for the associated device's transmitting or receiving a control packet;
- setting the indicator to the value corresponding to 2 if said indicator's corresponding time slot is scheduled for the associated device's transmitting or receiving a data packet; and
- setting the indicator to the value corresponding to 0 at the beginning of the medium access time.

16. A network including a plurality of devices as in claim 13, wherein said devices form a tree topology and each data packet is routed from its source to destination through the path in the tree topology.

17. A network including a plurality of devices as in claim 13, wherein
- devices form a tree topology including one root node;
- wherein each non-root node sends data packets originated from said each non-root node to said each non-root node's parent node, wherein said each non-root node's parent node is defined as the node that is one hop closer to the root node than said each node in said tree topology;
- wherein each non-root node forwards data packets received from one or a plurality of said each non-root node's child nodes to said each non-root node's parent node, wherein a child node of said each non-root node is defined as a node that is one hop farther from the root node than said non-root node in said tree topology.

* * * * *